(12) United States Patent
Simofi-Ilyes et al.

(10) Patent No.: US 11,951,797 B2
(45) Date of Patent: Apr. 9, 2024

(54) COOLING PACK ASSEMBLY

(71) Applicant: Brose Fahrzeugteile SE & Co. Kommanditgesellschaft, Würzburg, Würzburg (DE)

(72) Inventors: Attila Simofi-Ilyes, Clarkston, MI (US); John Fleck, Holly, MI (US); Tao Hong, Farmington Hills, MI (US); Stanley Simpson, Oxford, MI (US)

(73) Assignee: Brose Fahrzeugteile SE & Co. Kommanditgesellschaft, Würzburg (DE)

( * ) Notice: Subject to any disclaimer, the term of this patent is extended or adjusted under 35 U.S.C. 154(b) by 0 days.

(21) Appl. No.: 17/338,094

(22) Filed: Jun. 3, 2021

(65) Prior Publication Data

US 2022/0388367 A1  Dec. 8, 2022

(51) Int. Cl.
*B60H 1/00* (2006.01)
*B60K 11/02* (2006.01)
*B60K 11/04* (2006.01)

(52) U.S. Cl.
CPC ..... *B60H 1/00328* (2013.01); *B60H 1/00464* (2013.01); *B60K 11/02* (2013.01); *B60K 11/04* (2013.01)

(58) Field of Classification Search
CPC ................. B60H 1/00328; B60H 1/00464; B60K 11/02; B60K 11/04
USPC ..... 180/68.1, 68.2, 68.3, 68.4, 68.6; 165/41, 165/122, 140

See application file for complete search history.

(56) References Cited

U.S. PATENT DOCUMENTS

| 2,356,609 | A | * | 8/1944 | Payne | B60H 1/00464 165/127 |
| 2,505,790 | A | * | 5/1950 | Panthofer | F01P 11/08 165/149 |
| 3,978,919 | A | * | 9/1976 | Fachbach | F01P 11/12 165/125 |
| 4,137,982 | A | * | 2/1979 | Crews | F28D 1/0443 165/149 |

(Continued)

FOREIGN PATENT DOCUMENTS

| CN | 109278542 B | 6/2020 | |
| DE | 19731999 A1 | * 2/1999 | ............ F01P 3/18 |

(Continued)

*Primary Examiner* — Ljiljana V. Ciric
(74) *Attorney, Agent, or Firm* — Dickinson Wright PLLC

(57) ABSTRACT

The cooling pack assembly includes, a shroud, a fan, a first heat exchanger, and a second heat exchanger. The shroud has a plurality of sidewalls including a main sidewall. The shroud further defines an aperture. The fan is disposed within the aperture. The fan is configured to rotate about a rotational axis. The rotational axis is normal to a plane defined by the main sidewall. The first heat exchanger is disposed on at least one of the plurality of sidewalls. The first heat exchanger has a first cross-sectional area substantially parallel to the plane. The second heat exchanger is disposed on at least one the plurality of sidewalls. The second heat exchanger has a second cross-sectional area substantially parallel to the plane. The second cross-sectional area is less than the first cross-sectional area, and the first heat exchanger is disposed between the fan and the second heat exchanger.

19 Claims, 5 Drawing Sheets

(56) References Cited

U.S. PATENT DOCUMENTS

| | | | | |
|---|---|---|---|---|
| 4,367,793 | A * | 1/1983 | MacIntosh | F28F 9/0258 165/149 |
| 4,651,816 | A * | 3/1987 | Struss | F28F 9/002 165/76 |
| 4,909,311 | A * | 3/1990 | Nakamura | F01P 11/10 165/44 |
| 5,046,550 | A * | 9/1991 | Boll | B60K 11/04 123/41.31 |
| 5,046,554 | A * | 9/1991 | Iwasaki | B60K 11/04 165/44 |
| 5,176,200 | A * | 1/1993 | Shinmura | F28F 9/262 165/144 |
| 5,234,051 | A * | 8/1993 | Weizenburger | F01P 5/06 123/41.31 |
| 5,271,473 | A * | 12/1993 | Ikeda | B60K 11/04 296/203.02 |
| 5,316,079 | A * | 5/1994 | Hedeen | F28F 9/001 60/599 |
| 5,476,138 | A * | 12/1995 | Iwasaki | F28D 1/0435 165/41 |
| 5,522,457 | A * | 6/1996 | Lenz | F28D 1/024 180/68.1 |
| 5,526,873 | A * | 6/1996 | Marsais | F01P 3/18 123/41.31 |
| 5,660,149 | A * | 8/1997 | Lakerdas | F01P 5/06 123/41.01 |
| 5,671,803 | A * | 9/1997 | Tepas | F28F 9/002 165/41 |
| 5,771,961 | A * | 6/1998 | Alizadeh | F04D 29/582 165/41 |
| 5,813,489 | A * | 9/1998 | Potier | B60K 11/00 180/68.1 |
| 5,845,612 | A * | 12/1998 | Lakerdas | F01P 11/00 123/41.01 |
| 5,901,786 | A * | 5/1999 | Patel | F01P 7/026 165/41 |
| 5,970,925 | A * | 10/1999 | Lakerdas | B60K 11/04 123/41.11 |
| 6,155,335 | A * | 12/2000 | Acre | F28F 9/002 123/41.58 |
| 6,223,811 | B1 * | 5/2001 | Kodumudi | F28F 9/002 165/41 |
| 6,230,793 | B1 * | 5/2001 | Sumida | F28D 1/05375 165/140 |
| 6,401,801 | B1 * | 6/2002 | Dicke | F01P 5/02 165/41 |
| 6,435,264 | B1 * | 8/2002 | Konno | F01P 3/18 165/41 |
| 6,676,283 | B2 * | 1/2004 | Ozawa | B62D 25/084 362/802 |
| 6,684,937 | B2 * | 2/2004 | Lenz | F28D 1/0435 165/41 |
| 6,817,404 | B2 * | 11/2004 | Frana-Guthrie | B60H 1/00535 180/68.1 |
| 6,832,644 | B2 * | 12/2004 | Stauder | F28D 1/0435 165/41 |
| 6,874,570 | B2 * | 4/2005 | Horiuchi | F28F 9/002 165/41 |
| 6,883,589 | B2 * | 4/2005 | Ozawa | B60K 11/04 165/41 |
| 6,986,385 | B1 * | 1/2006 | Gilles | B60H 1/00328 62/243 |
| 7,044,203 | B2 * | 5/2006 | Yagi | F28F 9/002 165/122 |
| 7,150,335 | B2 * | 12/2006 | Sasano | B62D 25/084 165/41 |
| 7,284,594 | B2 * | 10/2007 | Sanada | F28D 1/0452 165/41 |
| 7,310,961 | B2 * | 12/2007 | Hoshi | B60H 1/00764 62/244 |
| 7,328,739 | B2 * | 2/2008 | Watanabe | F28F 9/0246 165/41 |
| 7,625,276 | B2 * | 12/2009 | Kim | F04D 29/526 180/68.1 |
| 7,640,966 | B2 * | 1/2010 | Maeda | F28F 9/002 165/41 |
| 7,730,734 | B2 * | 6/2010 | Hoshi | B60H 1/00392 62/244 |
| 7,845,392 | B2 * | 12/2010 | Morita | F28D 1/0452 165/41 |
| 7,882,913 | B2 * | 2/2011 | Maeda | B60K 11/04 180/68.6 |
| 7,886,860 | B2 * | 2/2011 | Spieth | B62D 25/084 165/47 |
| 8,230,910 | B2 * | 7/2012 | Bielesch | F04D 25/06 165/122 |
| 8,317,889 | B2 * | 11/2012 | Kobayashi | B60K 11/04 55/467 |
| 8,616,265 | B2 * | 12/2013 | Fell | B60K 11/04 165/41 |
| 8,646,555 | B2 * | 2/2014 | Reed | F01P 11/029 180/68.4 |
| 9,212,598 | B2 * | 12/2015 | Platt | F01P 3/18 |
| 9,261,011 | B2 * | 2/2016 | Keerl | F28F 21/06 |
| 9,505,300 | B2 * | 11/2016 | Grasso | F01P 11/10 |
| 9,694,668 | B1 * | 7/2017 | Yun | B60K 11/06 |
| 9,982,586 | B2 * | 5/2018 | Sovine | F01P 3/18 |
| 9,988,969 | B2 * | 6/2018 | Dziubinschi | F01P 11/10 |
| 10,215,496 | B2 * | 2/2019 | De Vos | F28D 7/0008 |
| 10,252,611 | B2 * | 4/2019 | Errick | B60K 11/085 |
| 10,287,962 | B2 * | 5/2019 | Kurokawa | B62D 49/06 |
| 10,480,390 | B2 * | 11/2019 | Miyamoto | F04D 19/002 |
| 10,584,465 | B2 * | 3/2020 | Sakon | B60K 11/02 |
| 10,704,456 | B2 * | 7/2020 | Dziubinschi | F01P 11/10 |
| 10,828,979 | B2 * | 11/2020 | Nakamura | B62D 35/02 |
| 11,014,440 | B2 * | 5/2021 | Glickman | B60K 11/04 |
| 11,602,985 | B2 * | 3/2023 | Weston | B60H 1/00042 |
| 11,607,920 | B2 * | 3/2023 | Schlangen | B62D 7/16 |
| 2002/0023735 | A1 * | 2/2002 | Uchikawa | F28F 9/001 165/149 |
| 2004/0211607 | A1 * | 10/2004 | Sasano | B62D 25/084 180/68.4 |
| 2008/0023173 | A1 * | 1/2008 | Savage | B60H 1/00328 165/41 |
| 2008/0283220 | A1 * | 11/2008 | Martin | F01P 11/12 165/95 |
| 2021/0403095 | A1 * | 12/2021 | Menez Sánchez | B62D 25/084 |
| 2022/0388367 | A1 * | 12/2022 | Simofi-Ilyes | B60H 1/00328 |

FOREIGN PATENT DOCUMENTS

| | | | |
|---|---|---|---|
| EP | 1048505 A2 * | 11/2000 | B60K 11/04 |
| EP | 1024045 B1 * | 11/2003 | B60K 11/04 |
| EP | 3815949 A1 * | 5/2021 | B60K 11/04 |
| JP | 2002168588 A * | 6/2002 | |

* cited by examiner

COOLING PACK ASSEMBLY

TECHNICAL FIELD

The present disclosure relates to reducing noise and vibration within a vehicle cooling system.

BACKGROUND

Many vehicles generally include second cooling systems configured to cool one or more vehicle components. The cooling systems may include a plurality of heat exchangers and a fan assembly configured to provide convection cooling of the heat exchangers. In some vehicles, however, space that would generally receive or house the cooling system may be limited due to other components or systems of the vehicle.

SUMMARY

According to one embodiment, is a cooling pack assembly is provided. The cooling pack assembly may include, a shroud, a fan, a first heat exchanger, and a second heat exchanger. The shroud may include a plurality of sidewalls including a main sidewall. The shroud further defines an aperture. The fan may be disposed within the aperture and may be configured to rotate about a rotational axis. The rotational axis is normal to a plane defined by the main sidewall. The first heat exchanger may be disposed on at least one of the plurality of sidewalls and may have a first cross-sectional area, substantially parallel to the plane. The second heat exchanger may be disposed on at least one the plurality of sidewalls and have a second cross-sectional area, substantially parallel to the plane. The first heat exchanger may be disposed between the fan and the second heat exchanger.

According to another embodiment, a cooling pack assembly for use in a battery-electric vehicle may include a cooling fan module having a support structure, a fan, a motor, a first heat exchanger, and a second heat exchanger. The fan module may include one or more fans and motors such as a multi-fan module. The cooling fan module may include a shroud provided with a main wall and a plurality of sidewalls extending therefrom such that the main wall defines an aperture. The fan may be disposed within the aperture and configured to rotate about a rotational axis. The first heat exchanger may have a first cross-sectional area. The second heat exchanger may be disposed between the main wall and the first heat exchanger and have a second cross-sectional area. The second cross-sectional area may be greater than the first cross-sectional area. The first heat exchanger may be spaced apart from a first sidewall of the plurality of sidewalls by a first distance and a second sidewall of the plurality of sidewalls by a second distance. The first distance may be substantially equal to the second distance.

According to yet another embodiment, a cooling pack assembly is provided. The cooling pack assembly may include a fan assembly, a first heat exchanger, and a second heat exchanger. The fan assembly may include a shroud having a main wall and a plurality of sidewalls extending therefrom. The main wall may define an aperture provided with an inner periphery. The fan assembly may include a fan, disposed in the aperture and configured to rotate about a rotational axis, and a plurality of blades and a band connecting distal ends of the plurality of blades to one another. The band may include an axially extending portion, a vertical portion, and a curved portion extending therebetween. The vertical portion may be axially spaced apart from the main sidewall and the curved portion may be curved around the inner periphery of the aperture. The first heat exchanger may be disposed on at least one of the plurality of sidewalls and may have a first cross-sectional area that may be substantially parallel to the plane. The second heat exchanger may be disposed on at least one of the plurality of sidewalls, and may have a second cross-sectional area that may be substantially parallel to the plane. As an example, the second cross-sectional area may be less than the first cross-sectional area, and the first heat exchanger may be disposed between the fan and the second heat exchanger.

DETAILED DESCRIPTION

Figure 1:
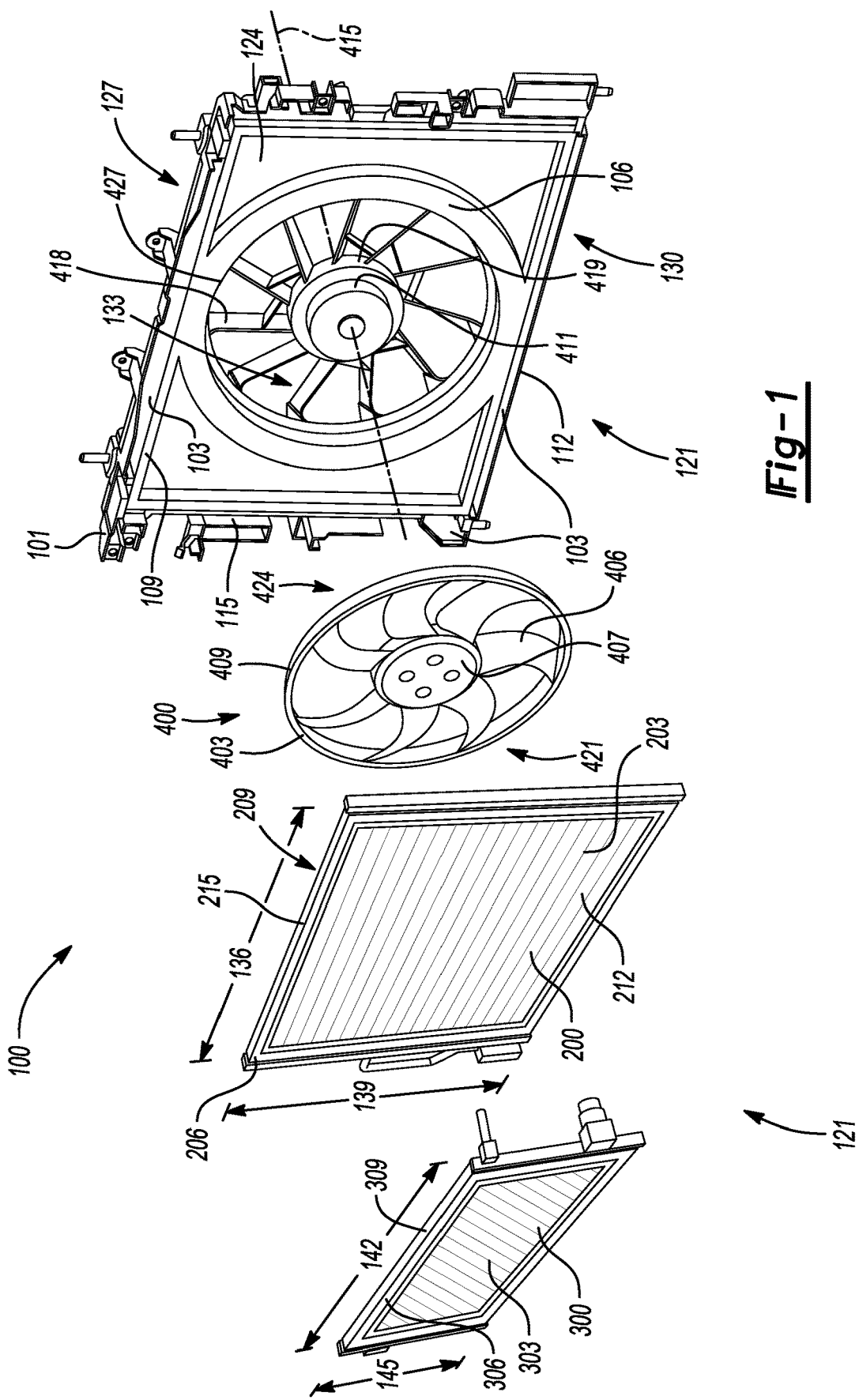
FIG. 1 depicts an exploded perspective view of an exemplary cooling assembly pack.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

As used in the specification and the appended claims, the singular form "a," "an," and "the" comprise plural referents unless the context clearly indicates otherwise. For example, reference to a component in the singular is intended to comprise a plurality of components.

The term "substantially" or "about" may be used herein to describe disclosed or claimed embodiments. The term "substantially" or "about" may modify a value or relative characteristic disclosed or claimed in the present disclosure. In such instances, "substantially" or "about" may signify that the value or relative characteristic it modifies is within ±0%, 0.1%, 0.5%, 1%, 2%, 3%, 4%, 5% or 10% of the value or relative characteristic.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). The term "and/or" may include any and all combinations of one or more of the associated listed items.

Although the terms first, second, third, etc. may be used to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Generally, cooling systems include a heat exchanger, such as a radiator and a cooling fan module that is configured to move or displace air from the heat exchanger to a downstream impediment. As one example, the heat exchanger may be a radiator or a condenser that transfers heat from a liquid coolant or refrigerant to an airstream. The heat source may be an internal combustion engine or an electric motor or other heat generating source. The side of the cooling fan module disposed closest to the radiator may be referred to as the upstream side and the side disposed further away from the radiator may be referred to as the downstream side. In one or more embodiments, the downstream impediment may be an internal combustion engine, an electric machine or motor, one or more batteries, or another vehicle component.

In vehicles provided with internal combustion engines (ICEs), the heat exchanger is typically supported by a structural frame, such as the chassis of the vehicle, and the cooling fan module may be supported by the chassis or carried by the heat exchanger. On the other hand, battery-electric vehicles (BEVs) may include a structural shroud that is mounted to the vehicle frame and that is configured to carry one or more heat exchangers. The shroud may have features for vehicle structure interface and may also nest the heat exchanges and the fan and motor. As an example, BEVs may include a first heat exchanger, such as a condenser, and a second heat exchanger, such as a radiator. The size and arrangement of the first and second heat exchangers with respect to the shroud, collectively referred to as a cooling pack assembly, has been shown to alter, such as improve, the acoustic performance of the cooling pack assembly. Improvements to acoustic performance of cooling assemblies, particularly those in BEVs that use motors that are quieter than ICEs, are desired.

Referring generally to the figures, a cooling pack assembly is provided. The cooling pack assembly may include a shroud that may include a plurality of sidewalls. The shroud may be configured to support at least one cooling component. For example, the shroud may be configured to support a first heat exchanger, a second heat exchanger, and a fan assembly. In one or more embodiments, the shroud may be configured to layer each of the first heat exchanger, second heat exchanger, and fan assembly substantially parallel to each other.

The shroud may include a plurality of sidewalls. In some embodiments, the shroud may comprise at least one of an upper sidewall, a lower sidewall, and a lateral sidewall. To allow the flow of fluid through the cooling pack assembly, the plurality of sidewalls may be configured to form a cooling aperture upon assembly. The cooling aperture may be similarly sized to one of the cooling components. For example, the cooling aperture may be similar in size to the first heat exchanger. The cooling aperture may further comprise an inner periphery. The inner periphery may be formed as a barrel. The barrel may extend axially from the main sidewall. As such, the barrel may extend parallel to the rotational axis. In some embodiments, the lateral sidewall may extending between one of an upper and lower sidewall. Further, the lateral sidewall may be configured to support at least one of a first and second heat exchanger.

The plurality of sidewalls of the shroud may be integrally connected. Additionally, or alternatively, at least one of the plurality of sidewalls may be removably connected to another of the sidewalls. As such, the shroud may be defined by an upper portion and a lower portion. The cooling aperture may be defined by the upper portion and lower portion. The cooling pack assembly may comprise an assembly interface. The assembly interface may be used to removably attach cooling components. Once in place, the assembly interface may be used to securely support cooling components. In some embodiments, at least one of the sidewalls may be configured to engage members of a vehicle frame. The engagement may help support the shroud and other cooling components. Further, the vehicle may be a battery-electric vehicle.

The cooling pack assembly may include a first heat exchanger. The first heat exchanger may be used to assist the phase change of refrigerant within a vehicle cooling system. The first heat exchanger may be a condenser. The first heat exchanger may include a first interface. The first interface may be used to removably attach the first heat exchanger to the shroud. As such, the first interface may be used by the shroud to support the first heat exchanger via the assembly interface. The first heat exchanger may have a first cross-sectional area. The first cross-sectional area may be similar in sized to fit within the cooling aperture. The first cross-sectional area may be partially defined by a first width and a first height.

The cooling pack assembly may include a second heat exchanger. The second heat exchanger may be used to assist the phase change of refrigerant within a vehicle cooling system. In particular, the second heat exchanger may be used in conjunction with a forced air induction system of a vehicle. The second heat exchanger may be a low temperature radiator. The second heat exchanger may include a second interface. The second interface may be used to removably attach the second heat exchanger to the shroud. As such, the second interface may be used by the shroud to support the second heat exchanger via the assembly interface. The second heat exchanger may have a second cross-sectional area. The second cross-sectional area maybe defined by a second width and a second height. The second heat exchanger may be configured to nest with the first heat exchanger in the shroud. In some embodiments, the first heat exchanger will be between the fan assembly and the second heat exchanger.

The cooling pack assembly may include a fan assembly. The fan assembly may include a shroud. Additionally, or alternatively, the fan assembly may include a fan interface. The fan interface may be used to removably attach the fan assembly to the shroud. As such, the fan assembly may be used by the shroud to support the fan assembly via the assembly interface. In some embodiments, the shroud may encompass the fan interface. The shroud may define a fan aperture. The fan aperture may be sized to house a plurality of fan blades. The fan blades may be configured to rotate within the fan aperture about a rotational axis. The plurality of fan blades may be configured to rotate on a rotor of a fan motor. The rotor may be disposed substantial about the rotational axis. In some embodiments, the rotor may be disposed along a perimeter of the motor housing. The fan assembly may define a pushing surface and a pulling surface. The pushing surface may correspond with the direction of fluid flowing from the fan assembly. The pulling surface may correspond with the direction of fluid flowing to the fan assembly. The pushing surface may be generally opposite the pushing surface. While the plurality of fan blades may be disposed within the fan assembly, the plurality of fan blades may be biased towards the pushing surface. The fan blades may extend between distal ends extending from each of the blades. The fan assembly may further include a band. The band may include a vertical portion and a curved portion. The band may be spaced apart from the main sidewall. In particular, the vertical portion may be spaced apart from the main sidewall. Further, the curved portion may be curved around the inner periphery of the aperture.

The shroud may be configured to offset cooling components. In one embodiment, the shroud may be attached to a fan assembly such that the fan assembly defines a rotational axis. The shroud may be further attached to the first heat exchanger such that the first heat exchanger defines a first cross-sectional area. Even further, the shroud may be attached to the second heat exchanger such that the second heat exchanger defines a second cross-sectional area. The shroud may be configured such that both the first cross-sectional area and the second cross-sectional area are substantially normal to the rotational axis. In such an embodiment, the first cross-sectional and the second cross-sectional area may be substantially parallel. The shroud may be configured such that the first heat exchanger is general adjacent to the fan assembly on a cooling surface, and generally adjacent to the second heat exchanger on a transfer surface. The cooling surface may be generally opposite of the transfer surface.

In such embodiments, the first cross-sectional area may be greater than the second cross-sectional area. Further, the first width may be greater than the second width. Additionally, or alternatively, the first height may be greater than the second height. In one example, the second cross-sectional area may be 80% of the first cross-sectional area.

The rotational axis may extend substantially central through the first cross-sectional area. In some embodiments, the rotational axis may also extend substantially central through the second cross-sectional area. As such, the second heat exchanger may be substantially adjacent central to the first heat exchanger. Noise produced by the rotation of the fan may be reduced when compared to other configurations, such as those comprising a second heat exchanger having generally the same cross-sectional area as the first cross-sectional area.

In other embodiments, the second heat exchanger may be radially offset from rotational axis. The radial offset may allow the rotational axis to extend through a non-central portion of the heat exchanger. The offset may be a vertical offset. The offset may allow for a top first edge of the first heat exchanger to line flush with a top second edge of the second heat exchanger. In such an embodiment, one of the second width and second height may be generally equal to the first width and the first height. The other of the second width and the second height may be substantially less that the corresponding first width and first height. Noise produced by the rotation of the fan may be reduced when compared to other configurations, such as those comprising a second heat exchanger having generally the same cross-sectional area as the first cross-sectional area or the same central location.

In one or more embodiments, the shroud may be used to support a first heating assembly, generally adjacent to a second shroud, and even further a fan assembly generally adjacent to one of the first and second heat exchangers.

FIG. 1 illustrates an exploded view of a cooling assembly pack 100. The cooling assembly pack 100 may include an assembly interface 124. The assembly interface 124 includes a shroud 427 having a plurality of sidewalls 103. The plurality of sidewalls 103 may include an upper sidewall 109, a lower sidewall 112, and a pair of lateral sidewalls 115. The assembly interface 124 is configured to removably attachable to plurality of cooling components 121, e.g., heat exchangers. The assembly interface 124 may having a top portion 127 and a bottom portion 130. The upper sidewall 109 is located on the top portion 127. The lower sidewall 112 is located on the bottom portion 130. The lateral sidewalls 115 are located in both the top portion 127 and the bottom portion 130.

The cooling assembly pack 100 may include a first heat exchanger 200. The first heat exchanger 200 may include a first interface 206. The first interface 206 is configured to removably attach to the assembly interface 124. The first heat exchanger 200 may include a first cross-sectional area 203. The first cross-sectional area 203 is defined by a first width 136 and a first height 139. The first heat exchanger 200 also may include a cooling surface 209 and a transfer surface. The cooling surface 209 is generally opposite of the transfer surface 212. Even further, the first heat exchanger 200 may include a first edge 215. The heat exchanger 200 may be a condenser (as illustrated) or may be a radiator.

The cooling assembly pack 100 may include a second heat exchanger 300. The second heat exchanger 300 may include a second interface 306. The second interface 306 is configured to removably attach to the assembly interface 124. The second heat exchanger 300 may include a second cross-sectional area 303. The second cross-sectional area 303 is defined by a second width 142 and a second height 145. The second heat exchanger 300 also may include a receiving surface 312. Even further, the second heat exchanger 300 may include a second edge 309. The heat exchanger 300 may be a radiator (as illustrated) or may be a condenser.

The cooling assembly pack 100 may include a fan assembly 400 supported by the shroud 427. The fan assembly 400 may include a fan 403 and a motor 411. The motor 411 is attached to the shroud 427 and the fan 403 is attached to a shaft of the motor 411. The fan 403 includes a plurality of blades 406 mounted on a fan hub 407. A band 409 connects between distal ends of the blades 406.

The fan 403 is operably coupled to a motor 411 and configured to rotate about a central axis 415. The fan assembly 400 may include a downstream side 424 that corresponds with pushing fluid, and an upstream side 421.

Figure 2:
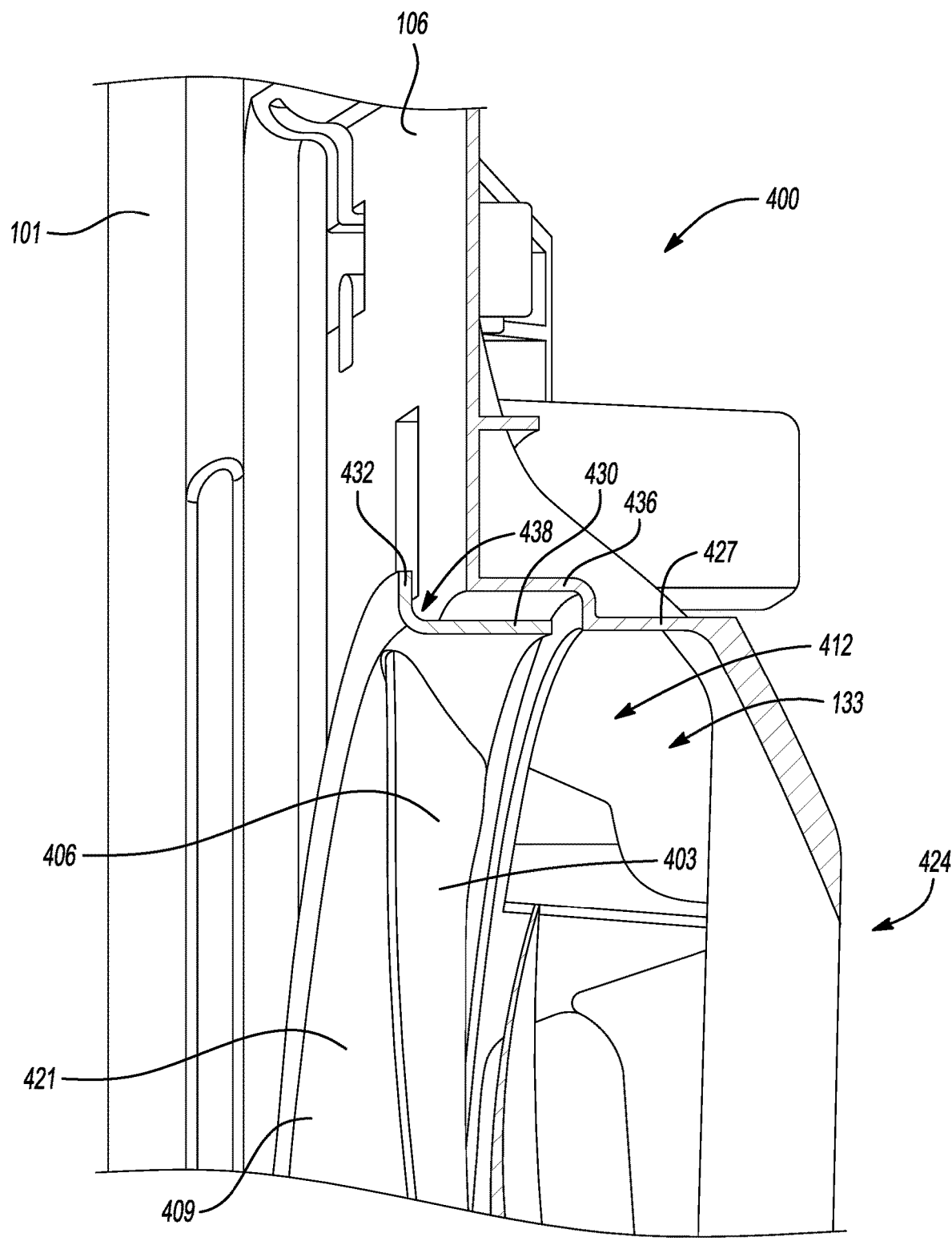
FIG. 2 depicts a partial cross-sectional view of the cooling assembly pack.

FIG. 2 depicts a cross-section of the shroud 427 and fan assembly 400. In cross section, the band 409 includes a first portion 430 extending in an axial direction and a second portion 432 extending in a radial direction substantially transverse to the axial direction. The second portion 432 is sized to cover a portion of the main wall 106.

The shroud 427 defines a fan aperture 133 configured to receive the fan 403. The shroud 427 has a barrel 436 that forms the periphery of the aperture 133. The shroud 427 also includes a plurality of stator arms 418 that extend radially inward to a motor-mount ring 419 that supports the motor 411. The fan aperture 133 is sized to fit and receive the fan 403. The fan 403 is disposed in the aperture 133 with the second portion 432 of the band 409 being partially received in the barrel 436 and with the first portion 432 of the band 409 being axially forward of the main wall 106 to define an air gap 438. The outer diameter of the band 409 may be greater than the diameter of the aperture 133.

Figure 3:
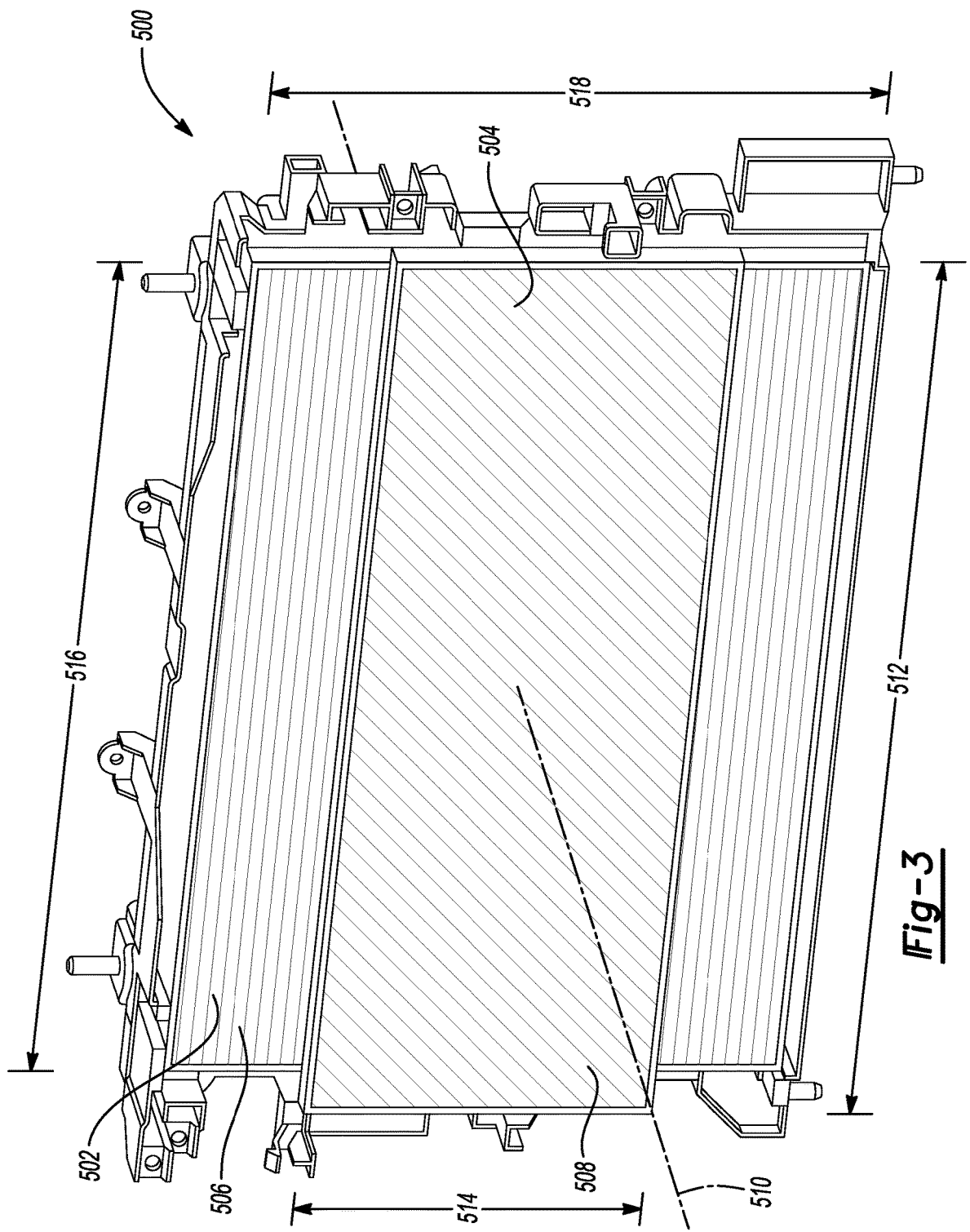
FIG. 3 depicts a perspective view of the cooling assembly pack.

Referring to FIG. 3, a cooling assembly pack 500 has a pair of heat exchangers 502 and 504 having a first cross-sectional area 506 and second cross-sectional area 508, respectively. The heat exchangers 502, 504 are arranged to have their cross-sectional area's normal to the central axis 510 and to have the center points of the cross-sectional areas 506, 508 radially centered on the axis 510. As depicted, both the second width 512 and the first width 516 are substantially equal, but the second height 514 is less than and first height 518. As such, the second cross-sectional area 508 is less than the first cross-sectional area 506.

Figure 4:
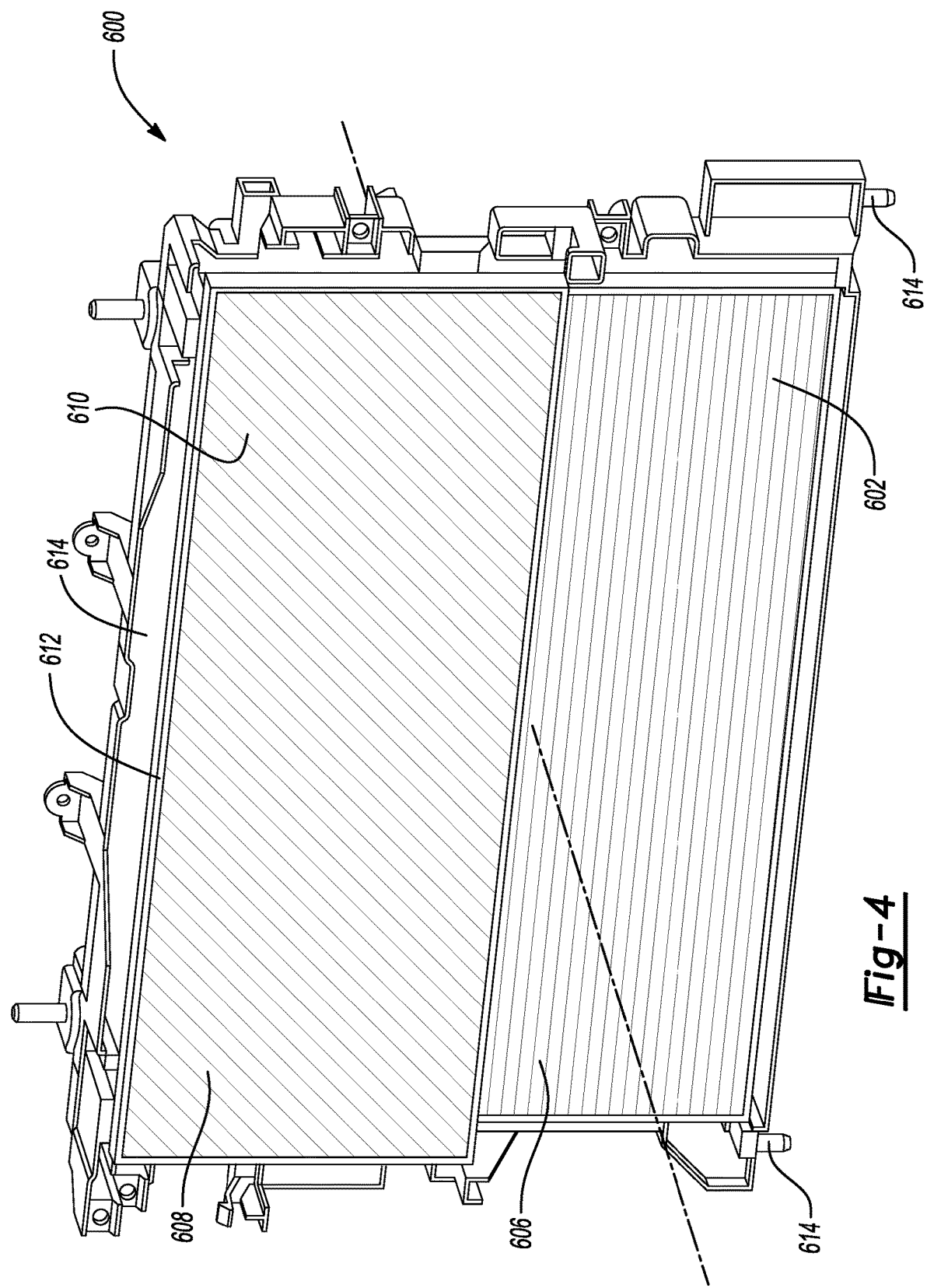
FIG. 4 depicts a perspective view of another cooling assembly pack.

FIG. 4 illustrates another cooling assembly pack 600 having a pair of heat exchangers 602 and 610. Like FIG. 3, the first heat exchanger 602 has a larger cross-sectional area 606 than the cross-sectional area 608 of the second heat exchanger 610. Unlike FIG. 3 in which the smaller heat exchanger is vertically centered with the larger heat exchanger, in FIG. 4, the smaller heat exchanger 610 is pushed to the top so that the upper edges 612 and 614 are substantially flush with each other.

Figure 5:
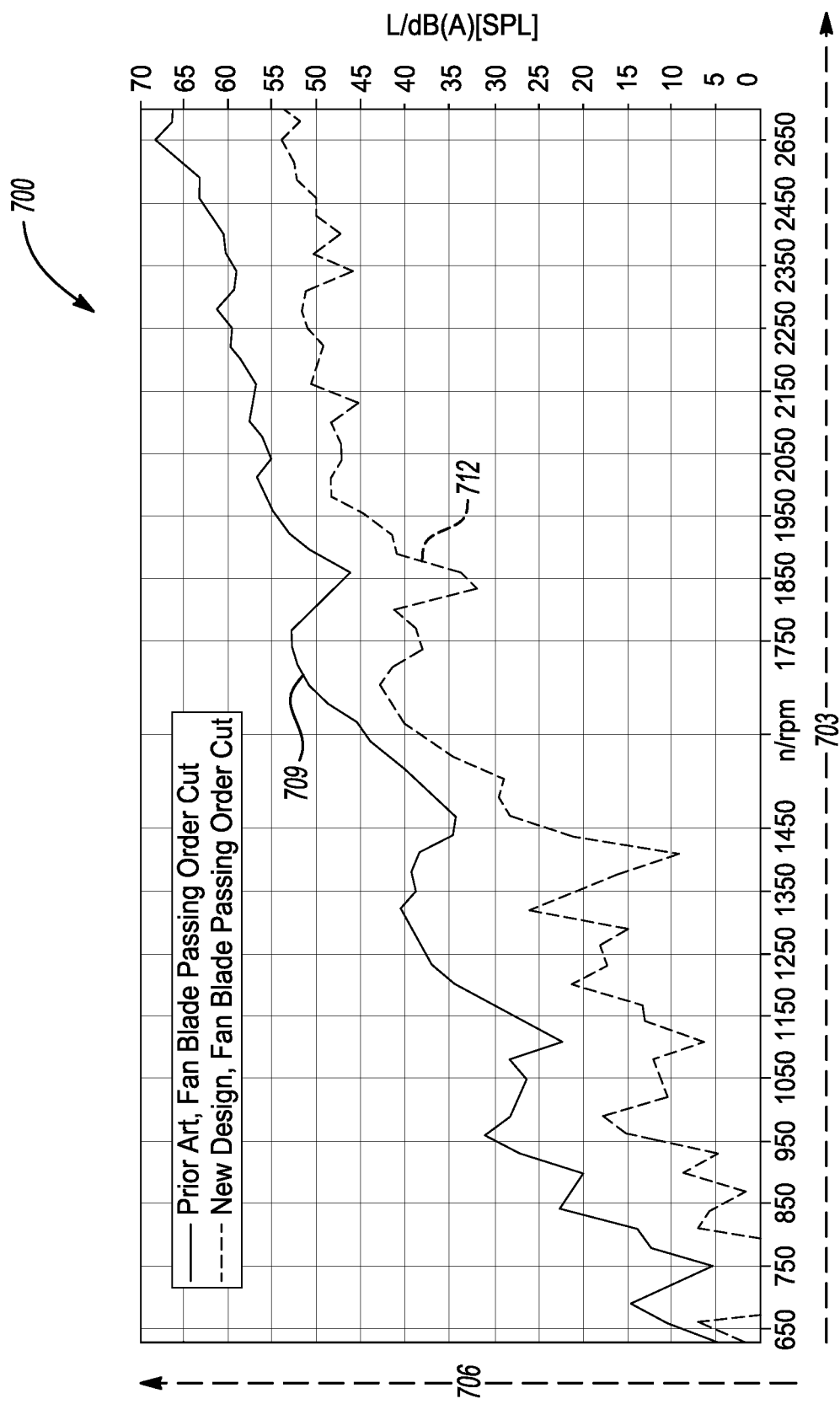
FIG. 5 illustrates a sound behavior graph of fan blade passing tones with respect to rotational speed for the cooling pack assembly in illustrated in FIG. 3 and the cooling pack assembly illustrated in FIG. 4.

FIG. 5 illustrates a sound behavior graph 700 of passing blade tones with respect to rotational speed for the cooling pack assembly illustrated in FIG. 3 and the cooling pack assembly illustrated in FIG. 4. The sound behavior graph 700 has an fan motor speed axis 703 and blade passing noise order amplitude axis 706. The motor speed may be measured in revolutions per minute (rpm). The blade passing noise may be measured by the decibel amplitude of the sound pressure level. The graph displays the first sound behavior 709 of a first version of a cooling pack assembly, e.g., FIG. 4, as well as the second sound behavior 712 of a second version of a cooling pack assembly, e.g., FIG. 3. As shown, the second sound behavior 712 is significantly lower than the first sound behavior 709 for every entry of the motor speed. While both the first sound behavior 709 and the second sound behavior 712 may have a similar inflection point pattern, the second sound behavior 712 shows steeper slopes, indicating greater reduction rates in blade passing noise. For example, the decline in blade passing noise of the second sound behavior 712 is much greater than the decline for the first sound behavior. As such, the disclosed system reduces noise of the fan.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

Parts List
100 cooling assembly pack
103 sidewalls
106 main wall
109 upper sidewall
112 sidewall
115 lateral sidewalls
121 cooling components
124 assembly interface
127 top portion
130 bottom portion
133 fan aperture
136 first width
139 first height
142 second width
145 second height
200 first heat exchanger
203 first cross-sectional area
206 first interface
209 cooling surface
212 transfer surface
215 first edge
300 second heat exchanger
303 second cross-sectional area
306 second interface
309 second edge
312 surface
400 fan assembly
403 fan
406 blades
407 fan hub
409 band 411 motor
415 central axis
418 fan interface
motor-mount ring 419
421 downstream side
424 upstream side
427 shroud
430 first portion
432 second portion
436 barrel
438 air gap
502 heat exchanger
504 heat exchanger
506 cross-sectional area
508 cross-sectional areas
510 axis
512 second width
514 second height
516 first width
518 first height
600 cooling assembly pack
602 heat exchanger
606 cross-sectional area
608 cross-sectional area
610 heat exchanger
612 upper edges
614 engagement members

What is claimed is:

1. A cooling pack assembly comprising:
a shroud having a plurality of sidewalls including a main wall, wherein the shroud defines an aperture;
a fan disposed within the aperture, the fan being configured to rotate about a rotational axis normal to a plane defined by the main wall;
a first heat exchanger disposed on at least one the plurality of sidewalls, wherein the first heat exchanger has a first cross-sectional area substantially parallel to the plane; and
a second heat exchanger disposed on at least one of the plurality of sidewalls, wherein the second heat exchanger has a second cross-sectional area substantially parallel to the plane, wherein the second cross-sectional area is smaller than the first cross-sectional area, and wherein the first heat exchanger is disposed between the fan and the second heat exchanger,
wherein the fan includes a plurality of blades and a band extending between distal ends of each of the blades, wherein in cross section, the band includes a first portion extending in an axial direction, a second portion extending in a direction substantially transverse to the axial direction, and a third portion extending between the first and second portions, and with respect to the axial direction, the second portion covers a portion of the main wall.

2. The cooling pack assembly of claim 1, wherein a first sidewall of the plurality of sidewalls carries the first heat exchanger and the second heat exchanger.

3. The cooling pack of claim 1, wherein the first sidewall of the plurality of sidewalls is a lateral sidewall extending between an upper sidewall and a lower sidewall of the plurality of sidewalls.

4. The cooling pack assembly of claim 1, wherein the second cross-sectional area is at least 20 percent smaller than the first cross-sectional area.

5. The cooling pack assembly of claim 1, wherein the first heat exchanger is a condenser.

6. A cooling pack assembly for use in a battery-electric vehicle, the cooling pack assembly comprising:
a cooling fan module including,
a shroud including a main wall and a plurality of sidewalls extending therefrom, wherein the main wall defines an aperture, and
a fan disposed in the aperture and configured to rotate about a rotational axis;
a first heat exchanger having a first cross-sectional area; and
a second heat exchanger disposed between the main wall and the first heat exchanger and having a second cross-sectional area, greater than the first cross-sectional area, wherein the first heat exchanger is spaced apart from a first sidewall of the plurality of sidewalls by a first distance and a second sidewall of the plurality of sidewalls by a second distance to improve acoustic performance, wherein the first distance is substantially equal to the second distance.

7. The cooling pack assembly of claim 6, wherein the first sidewall is disposed above the first heat exchanger and the second sidewall is disposed below the first heat exchanger.

8. The cooling pack assembly of claim 6, wherein the second sidewall includes a plurality of engagement members configured to engage a frame of the battery-electric vehicle.

9. The cooling pack assembly of claim 6, wherein the fan includes a plurality of blades and a circular band connected to distal ends of the blades, the band having an axially extending portion disposed in the aperture and a radially extending portion spaced from the main wall.

10. A cooling pack assembly comprising:
a fan assembly including a shroud having a main wall and a plurality of sidewalls extending therefrom, the main wall defining an aperture provided with an inner periphery, the fan assembly further including a fan disposed in the aperture and configured to rotate about a rotational axis, the fan having a plurality of blades and a band interconnecting distal ends of the blades, wherein the band has an axially extending portion, a vertical portion, and a curved portion extending therebetween, wherein the vertical portion is axially spaced apart from the main wall and the curved portion is curved around the inner periphery of the aperture;
a first heat exchanger disposed on at least one the plurality of sidewalls and having, a first cross-sectional area substantially parallel to the plane; and
a second heat exchanger disposed on at least one the plurality of sidewalls and having a second cross-sectional area that is substantially parallel to the plane and is smaller than the first cross-sectional area, wherein the first heat exchanger is disposed between the fan and the second heat exchanger.

11. The cooling pack assembly of claim 10, wherein the inner periphery of the aperture is formed by a barrel axially extending from the main wall away from the fan.

12. The cooling pack assembly of claim 10, wherein the axially extending portion is spaced apart from the barrel in a vertical direction substantially transverse to the rotational axis.

13. The cooling pack assembly of claim 10, wherein the first heat exchanger and the second heat exchanger each nest within the plurality of sidewalls.

14. The cooling pack assembly of claim 10, wherein a first sidewall of the plurality of sidewalls carries the first heat exchanger and the second heat exchanger.

15. The cooling pack of claim 10 wherein the first sidewall of the plurality of sidewalls is a lateral sidewall extending between upper and lower sidewalls of the plurality of sidewalls.

16. The cooling pack assembly of claim 10, wherein the second cross-sectional area is at least 20 percent smaller than the first cross-sectional area.

17. The cooling pack assembly of claim 10, wherein the fan has a flat portion disposed substantially parallel to the main wall.

18. The cooling pack assembly of claim 17, wherein the flat portion of the fan is spaced apart from the main wall.

19. The cooling pack assembly of claim 10, wherein the first and second cross-sectional areas are vertically centered on the rotational axis.

\* \* \* \* \*